Sept. 3, 1963 R. E. HOLMES, JR 3,102,758
WHEEL STRUCTURE
Filed Jan. 11, 1962 2 Sheets-Sheet 1
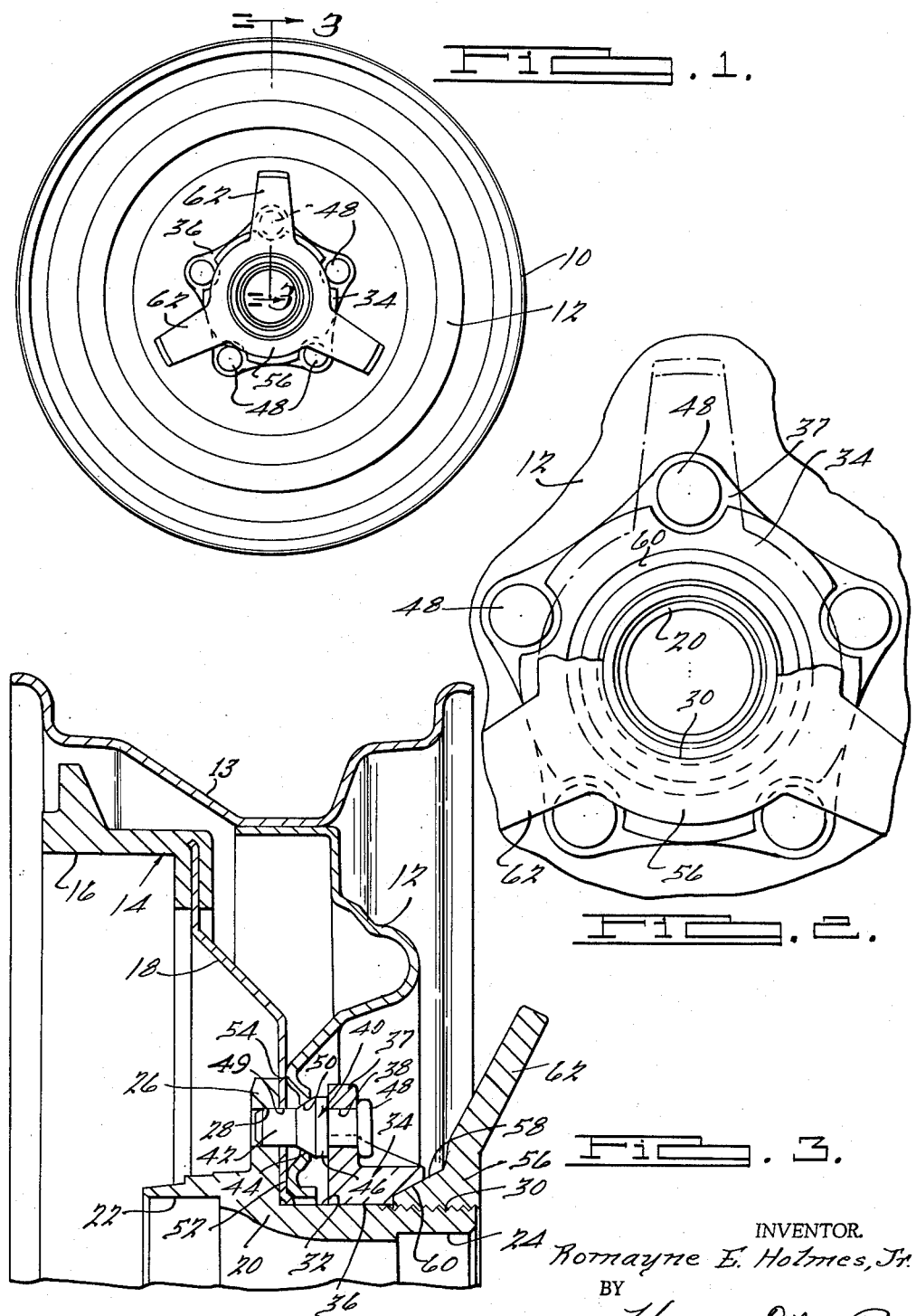
INVENTOR.
Romayne E. Holmes, Jr.
BY
Harness, Dickey & Pierce
ATTORNEYS

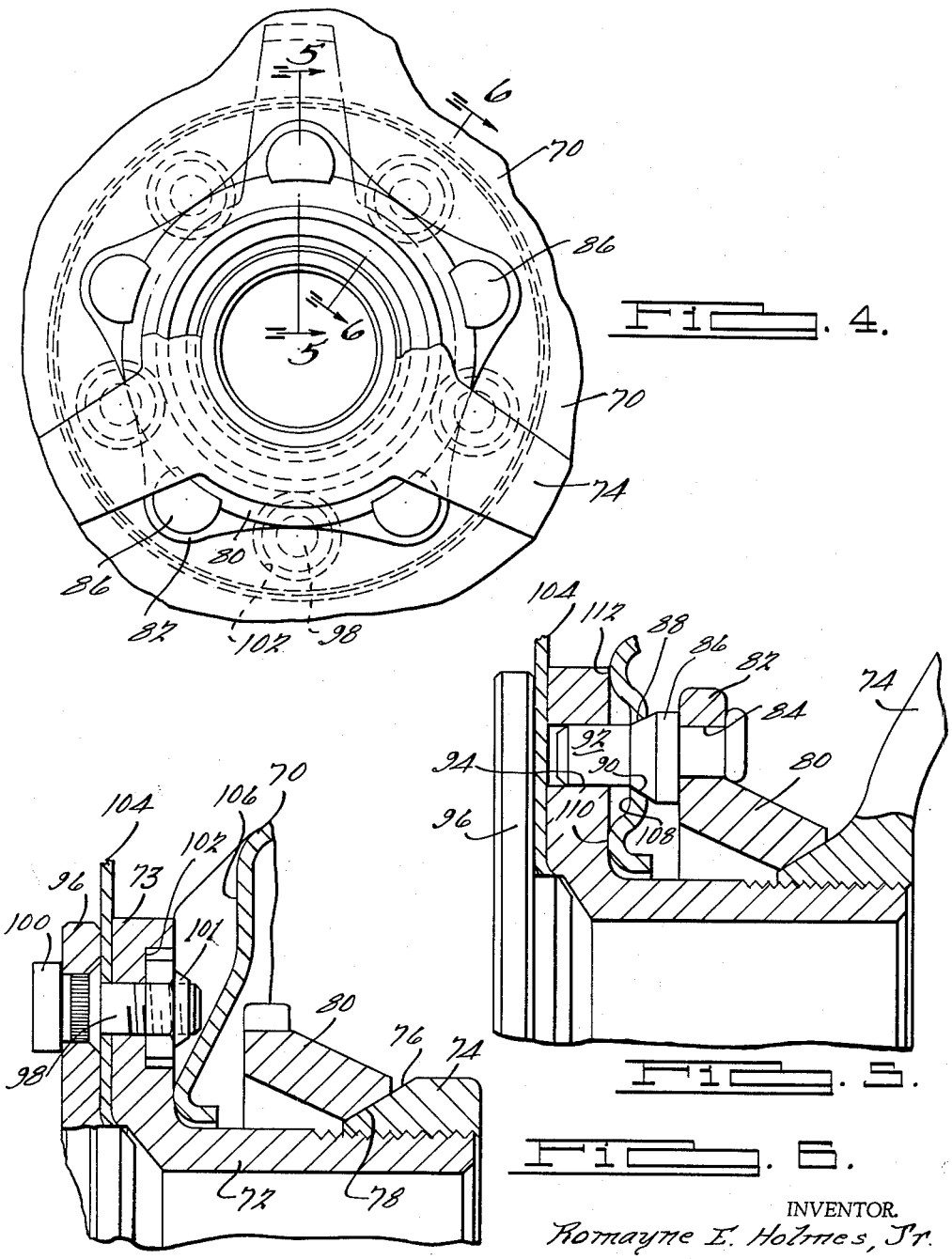

United States Patent Office 3,102,758
Patented Sept. 3, 1963

3,102,758
WHEEL STRUCTURE
Romayne E. Holmes, Jr., Madison Heights, Mich., assignor to Kelsey-Hayes Company, Romulus, Mich., a corporation of Delaware
Filed Jan. 11, 1962, Ser. No. 165,511
4 Claims. (Cl. 301—9)

This invention relates to wheels and particularly to a wheel mounting structure for mounting a standard passenger car wheel on a central hub.

It is an object of the present invention to provide a wheel mounting structure for a passenger car wheel in which the wheel may be removed and installed on the vehicle merely by the removal and application of a single large central nut threaded onto the hub.

It is another object of the present invention to provide a wheel mounting structure of the type utilizing a so-called "spinner nut" for rapid installation and removal of the wheel which is adapted for use with a standard passenger car wheel having a stamped sheet metal body welded or otherwise secured to a tire rim at its radially outer edge and having a plurality of stud or bolt receiving apertures therein.

It is another object of the present invention to provide a wheel mounting structure of the above character in which the wheel is both accurately located and securely fastened in place by a special adapter interposed between the nut and the wheel body.

Among the other objects of the invention are the provision of a wheel mounting structure of the above character which is of strong, rugged construction, which is convenient to use, which is inexpensive of manufacture and which is reliable in operation.

These and other objects of the present invention will become apparent from the following detailed description taken in conjunction with the accompanying drawings wherein:

FIGURE 1 is a front elevational view of a wheel and wheel mounting assembly embodying the features of the present invention;

FIG. 2 is an enlarged fragmentary view of the structure illustrated in FIG. 1;

FIG. 3 is a sectional view of the structure illustrated in FIG. 1 taken along the line 3—3 thereof;

FIG. 4 is a view of structure similarly illustrated in FIG. 2 showing another form of the invention; and FIGS. 5 and 6 are sectional views of the structure illustrated in FIG. 4, taken along the lines 5—5 and 6—6 thereof, respectively.

Many sports car enthusiasts, stock car racers and other car owners having a desire to rapidly change tires and the wheels on which the tires are mounted utilize a wheel mounting structure in which the removal or installation of the wheel requires only the removal or application of a single large "spinner" nut in addition to the physical handling of the wheel itself. Such structure permits the wheels to be changed in a much shorter period of time than is possible in wheel mounting structures utilizing a plurality of bolts or nut-receiving studs arranged in a circular pattern around the hub and passing through apertures in the wheel body. However, "spinner" nut wheel mounting structures which have heretofore been available require the use of special cast wheels that are made from magnesium alloys or the like and are extremely expensive. The structure of the present invention is intended to permit the use of standard passenger car wheels with a spinner nut mounting structure. This has the marked advantage of not only reducing wheel cost but passenger car wheels having stamped sheet metal bodies are more flexible than cast wheel bodies and are less likely to fracture upon the receipt of an impact.

FIGS. 1–3 illustrate structure particularly adapted for the front wheels of a passenger car wherein the numeral 12 identifies a stamped sheet metal wheel body or disk carrying a rim 13 welded or otherwise secured thereto at its radially outer edge. The wheel is illustrated in association with a brake drum 14 having a cast braking flange 16 connected to a stamped steel disk or body 18. Both the wheel and the brake flange are connected to a hub 20 having central bearing-receiving bores or openings 22 and 24. The hub 20 is provided with a radially outwardly extending flange 26 formed with through apertures 28. An externally threaded hub portion 30 is provided at the axially outer or outboard side thereof, while an intermediate hub portion 32 of cylindrical outer contour is provided between the threaded portion 30 and the flange 26. An adapter member 34 is sleeved over the threaded portion 30 of the hub and is provided with a central bore 36 which slidably and snugly fits on the cylindrical hub portion 32. The adapter 34 has radially outwardly extending bosses or portions 37, each of which has an aperture 38 adapted to align with one of the hub flange apertures 28. A stud or pin 40 is carried in each of the adapter apertures 38 and each has a portion 42 of straight cylindrical form projecting into and snugly fitted within the hub flange apertures 28. The pin portions 42 also pass through apertures 49 formed in the brake drum body 18. In addition, each stud 40 has an intermediate portion 44 of frusto-conical contour positioned between the hub flange 28 and the adapter flange 37 and which merges into a shoulder portion 46 abutting the inboard side of an adapter portion 37. The outboard end of each stud 40 is headed over against the outboard side of the adapter, as indicated at 48, thereby permanently securing each stud 40 to the adapter. The wheel body 12 has a plurality of apertures 50 formed therein arranged in a circular pattern around the hub 20, each of which receives the frusto-conical portion 44 of one of the pins 40. The surfaces defining the apertures 50 are tapered in an axially inwardly converging path, thus conforming to the surface of the frusto-conical stud portions 44. The frusto-conical stud portions 44 firmly engage the wall of each of the apertures 50 to accurately locate the wheel body and to apply an axially inward force thereto holding the wheel body 12 in engagement with the brake drum 18 wheel body 12 in engagement with the brake drum body 18 and forcing the brake drum body 18 against the hub flange 26. The wheel body 12 is of somewhat irregular contour in the areas surrounding the apertures 50 but will be seen to include portions 52 and 54 spaced radially inwardly and outwardly, respectively, of the circle on which the apertures 50 lie, which engage the brake drum body 18.

The adapter 34 is biased in an axially inward direction and is secured against deflection by a so-called "spinner" nut 56 threaded onto the hub portion 30 and having a frusto-conical seat 58 adapted to engage a frusto-conical wall 60 formed adjacent the axially outer side of the adapter 34. The nut seat 58 faces in a radially outward and axially inward direction, while the adapter surface 60 faces in the opposite direction. The nut 56 includes a plurality of radially outwardly extending arms 62 by which the nut may be conveniently manually rotated and tightened against the adapter 34. The tightening of the nut 56 moves the adapter 34 in an axially inward direction, firmly centering both the adapter 34 and also the wheel body 12 by virtue of the relationship of the frusto-conical stud portions 44 and the wheel body apertures 50 in which they engage. The wheel body 12 and brake drum body 18 are thus frictionally clamped against the hub flange 26 and are secured to the flange for rotation therewith by the studs 40 which pass through the apertures 50 and 49 thereof, respectively.

FIGS. 4-6 illustrate a somewhat modified form of the invention, which is adapted for use with the rear wheels of a passenger car. In this form of the invention, a wheel body 70 is secured to a hub 72 which has an annular, radially outwardly extending flange 73 and which is threaded at its axially outer end for the reception of a spinner nut 74. The spinner nut 74 has a frusto-conical seat 76 engageable with a conformably tapered frusto-conical surface 78 formed adjacent the axially outer side of an adapter 80. The adapter 80 has radially outwardly extending portions 82 provided with apertures 84, in each one of which one end of a stud or pin 86 is secured. As in the prior embodiment of the invention, the pins 86 are provided with frusto-conical surfaces or shoulders 88 engageable with the frusto-conical walls defining a plurality of circularly arranged apertures 90 in the wheel body 70. A straight cylindrical pin portion 92 of each of the pins 86 is received within an aperture 94 formed in the hub flange 73.

The hub 72 is secured to an axle flange 96 by means of a plurality of bolts 98 that pass through the axle flange and have heads 100 positioned on the axially inner side thereof. The bolts 98 pass through openings formed in the hub flange 73 for this purpose, which openings are positioned between the apertures 94. Nuts 101 are threaded onto the axially outer ends of the bolts and are received in recesses 102 formed on the axially outer side of the hub flange 73 around the bolts 98. A brake drum body or disk 104 is clamped between the axle flange 96 and the hub flange 73 and is secured to the axle flange 96 for rotation therewith, along with the hub 72. It will be seen that the axially inner surface of the wheel body 70 is provided with recesses 106 intermediate the apertures 90, which accommodate the outer ends of the bolts 98. As seen in FIG. 5, the wheel body 70 has flat portions 108 surrounding the apertures 90, while portions 110 and 112 spaced radially inwardly and radially outwardly, respectively, of the apertures 90 frictionally engage the flange 73 of the hub 72.

As in the first embodiment of the invention, the nut 74 is tightened to move the adapter 80 axially inwardly on the hub 72, so that the frusto-conical stud shoulders 88 properly locate the wheel body 70 by their engagement in the apertures 90 thereof and frictionally secure the wheel body 70 against the hub flange 73. Of course, the fact that the studs 86 pass through the apertures 90 and register in the apertures 94 of the hub flange 73 locks the wheel to the hub for co-rotation therewith.

It is to be noted that the wheel body 12 of the first embodiment of the invention and the wheel body 70 of the second embodiment of the invention are of like construction and correspond to the wheel bodies of standard passenger car wheels. Such wheels are made in mass production and are readily available at a reasonable cost. Accordingly, automobile owners desiring to utilize the wheel mounting structure of the present invention for the rapid and quick changing of wheels and tires may do so without the necessity of purchasing special wheels for this purpose, and continue to use the original factory equipped wheels.

While it will be apparent that the preferred embodiments herein illustrated are well calculated to fulfill the objects above stated, it will be appreciated that the invention is suceptible to modification, variation and change without departing from the proper scope or fair meaning of the subjoined claims.

What is claimed is:

1. A wheel mounting structure for use with a wheel having a body provided with a plurality of apertures spaced around the axis of rotation thereof, said structure including a hub having a radially outwardly extending flange provided with apertures therein adapted to align with the apertures of the wheel, an adapter member separate from said wheel and having a plurality of stud portions removably inserted through the wheel apertures and into the apertures in said hub flange, said stud portions having frusto-conical shoulders engageable with the surfaces of the wheel body defining the apertures therein, a nut threaded on said hub having a frusto-conical seat and a frusto-conical surface on said adapter conformably engageable by the seat of said nut for biasing said adapter in an axially inward direction and for preventing angular deflection of said adapter relative to the axis of rotation of the wheel.

2. A wheel mounting structure for use with a wheel having a body provided with a plurality of apertures spaced around the axis of rotation thereof, said structure including a hub having a radially outwardly extending flange provided with apertures therein adapted to align with the apertures of the wheel, a threaded portion at the axially outer end thereof and an intermediate portion of cylindrical shape, and an adapter member separate from said wheel having a central bore defining surface and a plurality of stud portions removably inserted through the apertures of the wheel and into the apertures in said hub flange, said stud portions having frusto-conical shoulders engageable with surfaces of the wheel body defining the apertures therein, said hub bore defining surface being snugly fitted on the intermediate cylindrical portion of said hub and a nut threaded on the threaded portion of said hub for applying an axially inward force to said adapter member, said nut having a frusto-conical seat facing in a radially outwardly and axially inward direction and said adapter member being provided with a surface conformably engageable by said seat.

3. A wheel mounting structure for use with a wheel having a body provided with a plurality of apertures spaced around the axis of rotation thereof, said structure including a hub having a radially outwardly extending flange provided with a plurality of apertures therein adapted to align with the apertures of the wheel and bearing receiving bore portions, a brake drum having a radially extended body portion provided with apertures disposed in alignment with the apertures in said hub flange, and an adapter member separate from said wheel and said brake drum and having a plurality of stud portions removably inserted through the apertures in said wheel and brake drum body and into the apertures in said hub flange and a conical seat at its axially outer side, said stud portions having frusto-conical shoulders engageable with the surfaces of said wheel body defining the apertures therein and a nut threaded on said hub and having a conical surface engageable with said conical seat for biasing said adapter in an axially inward direction and maintaining said stud portions disposed in a direction parallel to the axis of rotation of said wheel.

4. A wheel mounting structure for use with a wheel having a body provided with a plurality of apertures spaced around the axis of rotation thereof, said structure including a hub having a radially outwardly extending flange provided with apertures therein adapted to align with the apertures in the wheel, an adapter member separate from said wheel having a radially extending wall portion provided with an aperture therein adapted to be arranged in axial alignment with an aperture in the wheel, a stud having one end thereof fixedly disposed in the aperture of the adapter member, said stud having portions engageable with the radially extending wall of said adapter on opposite sides thereof, said stud being removably insertable through an aperture in the wheel and into one of the apertures of said hub flange, a frusto-conical shoulder on said stud engageable with the surface of the wheel defining the aperture through which said stud passes, a conical seat on the axially outer side of said adapter, and a nut threaded onto said hub and having a conical surface engageable with said conical seat for biasing said adapter member in an axially inward direction.

References Cited in the file of this patent

UNITED STATES PATENTS

| | | |
|---|---|---|
| 1,296,849 | Putnam | Mar. 11, 1919 |
| 1,388,665 | Putnam | Aug. 23, 1921 |
| 2,047,895 | Sinclair | July 14, 1936 |

FOREIGN PATENTS

| | | |
|---|---|---|
| 1,133,321 | France | Nov. 19, 1956 |